3,349,069
POLYHALOGENOUS COPOLYMER
COMPOSITIONS
Pauls Davis, Gibraltar, and Kurt C. Frisch and Edward J. Fujiwara, Grosse Ile, Mich., assignors to Wyandotte Chemicals Corporation, Wyandotte, Mich., a corporation of Michigan
No Drawing. Filed Oct. 10, 1963, Ser. No. 315,410
29 Claims. (Cl. 260—92.3)

The present invention relates to copolymers, and is more particularly concerned with polyhalogenous copolymers which have excellent resistance to chemical action and to fire, and which copolymers are useful for the production of various resinous products, as well as for further reaction with other materials to form useful plastics and rubber compositions having improved chemical and fire resistance.

Copolymers prepared by the reaction of lower-alkylene oxides with ethylenically-unsaturated compounds are known in the art. Such compounds, as disclosed in U.S. Patent 3,077,467, are useful for many purposes including the preparation of moldings, films, fibers, and coatings. However, although they have many useful and highly desirable properties, the compounds disclosed are highly flammable, and cannot be used for applications requiring some degree of fire resistance.

It is an object of the present invention to provide a new and useful class of polyhalogenous copolymers. An additional object is the provision of a novel class of polyhalogenous copolymers which are useful as intermediates in the preparation of polymeric compositions which are self-extinguishing and which in some cases may be non-burning. Another object is to provide a new class of copolymers which have a high permanent halogen content. A further object is the provision of a new class of polyhalogenous copolymers having permanent fire resistance. Still an additional object is to provide a novel class of polyhalogenous copolymers useful in the preparation of polymeric compositions having improved chemical resistance. Yet another object is to provide a novel class of polyhalogenous copolymers which exhibit improved thermal properties. Still another object is the provision of a novel class of copolymers having pendant polymerizable double bond-containing groups by means of which the copolymers may be cross-linked to produce resinous compositions and compounded rubbers having an improved degree of fire and chemical resistance. A still further object is the provision of a method for the preparation of said polyhalogenous copolymers. Additional objects will be apparent to one skilled in the art and still other objects will become apparent hereinafter.

It has now been found that the foregoing and additional objects are accomplished by the provision of a novel class of polyhalogenous copolymers having a relatively high halogen content, which copolymers are produced by copolymerizing a polyhalogenous alkylene oxide with an ethylenically-unsaturated compound having at least two copolymerizable carbon-to-carbon double bonds. The resulting copolymer is characterized by the presence of pendant alkyl groups having up to two carbon atoms and containing at least two halogen atoms bonded to the same terminal carbon atom, the polyhalogenous alkyl groups being built into the copolymer chain as extra-linear substituents of the oxyalkylene moiety of the composition. The present compositions also contain pendant ethylenically unsaturated groups, since only one unsaturated group is required for reaction with the epoxide group of the alkylene oxide. This enables the linear copolymer chains to be subsequently cross-linked if desired to produce plastics and rubber compositions having excellent physical properties such as chemical stability and fire resistance.

*Polyhalogenous alkylene oxides*

The polyhalogenous alkylene oxides which are employed as starting materials to prepare the copolymers of the invention are vicinal alkylene oxides containing from three to four carbon atoms, and having attached to a carbon atom of the oxirane ring an alkyl group having up to two carbon atoms and containing at least two and preferably three halogen atoms attached to the terminal carbon atom. In addition, when the alkyl group contains two carbon atoms, the second carbon atom may also contain halogen substituents. The term "oxirane ring" refers to a three-membered cyclic ether group represented by the formula:

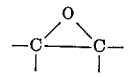

wherein the ether oxygen is bonded to adjacent carbon atoms. Representative of such polyhalogenous alkylene oxides are 1,1-dichloro-2,3-epoxypropane,
1,1,1-trichloro-2,3-epoxypropane,
1,1,1-trifluoro-2,3-epoxypropane,
1-bromo-1,1-dichloro-2,3-epoxypropane,
1,1-dichloro-1-fluoro-2,3-epoxypropane,
1,1-difluoro-1-chloro-2,3-epoxypropane, other mixed
1,1,1-trihalo-2,3-epoxypropanes,
1,1,1-tribromo-3,4-epoxybutane,
1,1,1-trichloro-3,4-epoxybutane,
1,1-dichloro-3,4-epoxybutane,
1,1,1,2,2-pentachloro-3,4-epoxybutane,
1,1,1,4,4-pentachloro-2,3-epoxybutane,
1,1,1,2,2-pentafluoro-3,4-epoxybutane,
1,1,1,2,2-mixed pentahalo-3,4-epoxybutane, etc.

As is obvious from these examples, the halogens bonded to these polyhalogenated alkylene oxides, and consequently to the pendant polyhalogenoalkyl groups of the polyhalogenous copolymers, may be any halogen or mixture of halogens. Of the halogens, those having atomic weights of 19 to 80, including fluorine, chlorine, and bromine, are preferred. Preferably, all three of the substitutable valences of the terminal carbon atom of the polyhaloalkyl group are satisfied by halogen atoms.

The polyhalogenous epoxypropanes used in the present invention for the preparation of polyhalogenous polyhydroxy copolymers may be prepared by known methods such as by the dehydrohalogenation of the appropriate polyhalogenated secondary alcohol in sodium hydroxide solution. For example 1,1-dichloro-2,3-epoxypropane may be prepared by the dehydrohalogenation of 1,1,3-trichloro-2-propanol. 1,1,1-trichloro-2,3-epoxypropane may be prepared by the dehydrohalogenation of 1,1,1,3-tetrachloro-2-propanol. The propanol used in the process may in turn be prepared in known manner by the reduction of the appropriate halogenated acetone with aluminum isopropoxide in isopropanol.

The 1-polyhalogeno-3,4-epoxybutanes may be prepared by reacting the appropriate polyhalomethane with 1-hydroxypropene-2 in the presence of a source of free radicals, and dehydrohalogenating the resulting adduct with a base, as described in Canadian Patent No. 527,462.

1,1,1-trichloro-3,4-epoxybutane may be prepared by the partial dehydrohalogenation of 1,1,1-trichloro-3-bromo-4-butanol in the presence of potassium hydroxide, as disclosed in U.S. Patent No. 2,561,516.

When the polyhalogenous alkylene oxides react, the oxirane ring is opened with the breaking of an oxygen bond to form a bivalent radical wherein the members of the oxirane group form a bivalent linear chain having the polyhalogenous lower-alkyl group, originally attached to a carbon atom of the oxirane ring, as an extra-linear substituent. The bivalent oxyalkylene radical may be bonded through each valence to a carbon atom of the ethylenic group of the ethylenically-unsaturated compound with which the alkylene oxide copolymerizes.

Ethylenically-unsaturated compound

The compounds which may be used in the present invention for copolymerization with the polyhalogenous alkylene oxides are the ethylenically-unsaturated compounds containing at least two polymerizable carbon-to-carbon double bonds. Among such compounds are butadiene, isoprene, chloroprene, furane, and divinyl benzene. Other suitable materials are cyclopentadiene, bicyclopentadiene and sorbic acid derivatives (butadiene carboxylic acid derivatives).

Catalyst

A variety of catalysts may be employed to effect the reaction of the alkylene oxide with the ethylenically unsaturated compound. The catalysts include those of the Friedel-Crafts type such as boron trifluoride, ferric chloride, anhydrous aluminum trichloride, zinc chloride, stannic chloride, antimony trifluoride, and complexes of these catalysts, such as boron trifluoride etherates, etc.; acid type catalysts such as hydrofluoric acid, acid fluoride salts such as potassium acid fluoride, fluoboric acid, fluosilicic acid, fluoplumbic acid, perchloric acid, sulfuric acid, phosphoric acid, etc.; other catalysts such as antimony pentachloride, alkoxides and alcoholates of aluminum, etc. The preferred catalysts are of the Lewis acid type, including the aforesaid Friedel-Crafts and acid types, and especially boron trifluoride, and phosphorus pentafluoride.

The amount of catalyst to be used depends on the compound used as catalyst and upon the reaction conditions. Amounts of catalyst up to 10% by weight based on the amount of reactants may be used, with smaller amounts, e.g., up to 2% or 3%, being generally satisfactory and economically preferred. For example, when boron trifluoride is used as the catalyst, good results are obtained with amounts ranging from a few hundredths of 1% to 5%, the preferred range being from about 0.1% to about 0.5% based on the total quantities of reactants. When small amounts of catalyst are used, the rate of reaction is generally slower, and it may be necessary to use higher reaction temperatures.

Solvent

The present reaction is preferably carried out in the presence of an organic solvent. It has been found that, in order to obtain the desired products in good yield, polar solvents should be used, although non-polar solvents may be used for some purposes where reduced yields can be tolerated. Among the suitable solvents are the cellosolves, e.g., butylcellosolve (2-butoxyethanol), methylene chloride, methyl chloride, chloroform, and other similar materials.

Cross-linking of copolymers

When a polyfunctional ethylenically-unsaturated compound having at least two double bonds is copolymerized with an alkylene oxide, the structure of the resulting copolymer is characterized by the presence of active double bond-containing groups capable of further copolymerization. Generally the double bond containing groups are present in pendant relationship. Consequently, the copolymer chains may be cross-linked to each other by appropriate reaction. The conditions for cross-linking are in general conventional as in the cross-linking of any unsaturated polymer.

Cross-linking may be accomplished by first epoxidizing the pendant double bond by means of a suitable epoxidizing agent such as peracetic acid. Other suitable epoxidizing agents are $H_2O_2$, HOCl, and other peracids. The linear copolymer may then be cross-linked by means of any catalyst suitable for cross-linking epoxy resins generally. Among such cross-linking agents are the diamines such as ethylene diamine, methylene dianiline, or the like. Another suitable type of epoxy cross-linking agent is the polycarboxylic compound type such as maleic or phthalic anhydride or acid, or other such materials commonly used. Alternatively, catalyst-type epoxy cross-linking agents such as triethanolamine or Quadrol (N,N,N',N'-tetrakis-(2-hydroxypropyl)ethylene diamine) may be used. This method together with the products produced thereby is more fully disclosed and claimed in copending application of the present inventors entitled "Polyhalogenous Epoxy Copolymers," filed concurrently herewith.

The present compounds may be also be cross-linked by means of polymerizable ethylenically-unsaturated compounds such as divinylbenzene, or by rubber vulcanizing agents such as sulfur.

The present copolymers may be used in the linear form as thermoplastic materials for the production of fire resistant articles. They may also be compounded with rubbers such as natural rubber, gum rubber stock, artificial rubber such as GRS, neoprene, ethylene or propylene rubbers, and silicone rubbers, and subsequently cross-linked or vulcanized to produce useful articles.

The following examples are given by way of illustration only and are not to be construed as limiting.

All experiments described in the examples which follow were carried out in standard laboratory glassware.

The batch preparations of 1,1,1-trichloro-2,3-epoxypropane/butadiene copolymers were carried out in a two-liter, jacketed resin kettle, equipped with a Dry Ice condenser, nitrogen sparger, stirrer, thermocouple, and an inlet for introducing the catalyst above the reaction medium. The jacketed resin flask was cooled by circulating cold methanol. The methanol was automatically cooled in a Dry Ice-acetone bath, the temperature of which was controlled from the temperature recorder. The $BF_3$ gas was metered by displacing $CCl_4$ from a calibrated flask.

The continuous copolymerization of 1,1,1-trichloro-2,3-epoxypropane and butadiene was conducted in a 120 cm. glass-jacketed tube reactor, fitted with a condenser to cool the refrigerant liquids used for the reactor. The solutions containing the monomers and catalyst were forced by nitrogen pressure from an ice-cooled storage flask in polyethylene tubing through two calibrated Fischer and Porter precision bore glass flowraters into a 20 cm. long jacketed mixing tube maintained at ca. <60° C. The reaction mixture was then passed into the reactor tube, the temperature being maintained by the type of refrigerant liquids used (dichlorodifluoromethane −29.8° C.; 1,2-dichloro-1,1,2,2-tetrafluoroethane +4.1° C., trichlorofluoromethane +23.7° C.). The tube was tilted up ca. 3° from level to insure constant flow rate of the solutions through the reactor. The solution was pumped through an ice bath into a graduated cylinder. The jacketed mixing tube was cooled with circulating methanol cooled with Dry Ice-acetone mixture.

The molecular weights were determined in a modified Cottrel ebullimetric apparatus. The temperature was measured with a Beckmann differential thermometer.

The following examples illustrate the preparation of copolymers of 1,1,1-trichloro-2,3-epoxypropane with isoprene. The reaction may be illustrated by the following equation:

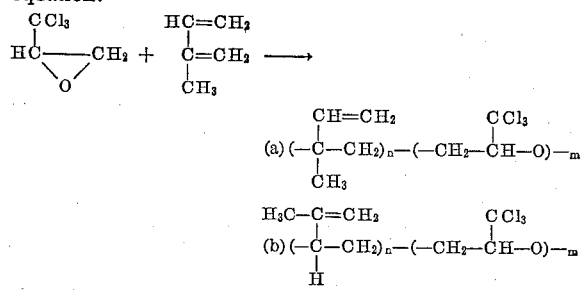

The resultant product is a polymeric polyether chain having both pendant halogen-containing groups and pendant vinyl groups. Generally mixtures of several possible isomers are formed (head-to-head, head-to-tail, tail-to-tail, and mixtures thereof).

*Example 1*

A mixture was prepared containing 1 mole of 1,1,1-trichloro-2,3-epoxypropane and 1 mole of isoprene in methylene chloride. Gaseous $BF_3$ was added. The threshold concentration required to initiate polymerization was 0.009 mole of $BF_3$. However, a total of 0.03 mole was added in order to increase the rate of reaction. After initiation, polymerization proceeded at a very rapid rate, the reaction being complete within approximately three minutes. The product was isolated and purified by precipitation in methanol. The yield of converted monomers to polymer was nearly quantitative. The methanol-insoluble product was a colorless amorphous free-flowing powder which was non-tacky at room temperature.

*Example 2*

The reaction described in Example 1 was repeated utilizing a molar ratio of 1,1,1-trichloro-2,3-epoxypropane to isoprene of 2:1.4. The conversions dropped to 70%. The polymeric product was a hard, tack-free product. X-ray analysis indicated a very low percentage of crystallinity (less than 5%).

*Example 3*

A 1,1,1-trichloro-2,3-epoxypropane/isoprene copolymer having a 1:1.1 molar ratio was prepared as in Example 1 above. The product was a white, amorphous solid, becoming tacky at 90–93° C., and fusing at 105–110° C. The product showed slight yellowing at a temperature above 225° C. and started to decompose with gas evolution at 265° C., turning yellow-brown. The molecular weight, determined by boiling point elevation in benzene, was 1,246.

The following example illustrates the preparation of a copolymer of 1,1,1-trichloro-2,3-epoxypropane and butadiene. The reaction may be illustrated as follows:

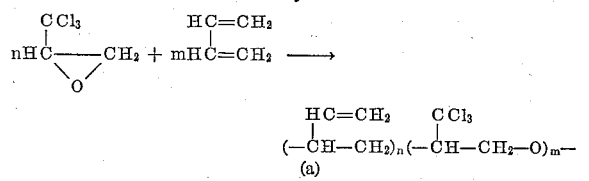

or

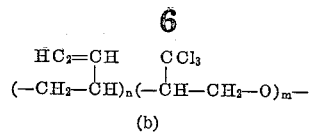

Generally a mixture of about 60% head-to-tail polymerization (a) and 40% head-to-head polymerization (b) is obtained.

*Example 4.—Copolymerization of 1,1,1-trichloro-2,3-epoxypropane with butadiene-2:1 molar ratio*

In a two-liter jacketed resin kettle, 1.5 liters of methylene chloride and 486 g. (3 moles) of 1,1,1-trichloro-2,3-epoxypropane were mixed and the solution cooled to −30° C. before 81 g. (1.5 moles) of butadiene were added. To the clear, vigorously stirred solution, 1.5 liters (0.055 mole) of $BF_3$ gas were introduced above the reaction mixture. The initiation of the reaction was manifested by a 30° C. temperature exotherm which, after approximately three minutes, reached a maximum of about 0° C. The mixture was cooled to −30° C. and transferred to a round-bottom flask and the catalyst complex killed with gaseous dry ammonia. The amount of ammonia used was measured by a color change of the solution from light orange to pale yellow. There were no temperature changes observed. The polymerization was repeated using identical concentrations and conditions, and the two solutions combined.

Twenty-five grams of $NaHCO_3$ as a buffer were added to the methylene chloride-polymer solution and the mixture steam distilled. The first fraction to distill over was methylene chloride, followed by an azeotropic mixture of 1,1,1-trichloro-2,3-epoxypropane and water. At the completion of the distillation, the pale yellow, free-flowing polymer was washed with cold water several times to remove the last traces of salts. Yield of isolated polymer based on the two polymerizations was 89% (1005 g.). The polymer had a molecular weight by boiling point elevation of 1175, a 56.5% chlorine content (theoretical is 56.4%), a 44° C. softening point, a hydroxyl number by isocyanate technique of 1.03%, a density of 1.588 at 23.5° C., and a dilute solution viscosity (DSV)=0.04.

A 50 g. sample of the copolymer was dissolved in 450 ml. of anhydrous acetone and 50 ml. of water were added with stirring, causing a fraction of the soluble polymer to oil out. The soluble and insoluble fractions were separated and isolated by vacuum stripping. The insoluble fraction had 56.3% chlorine while the acetone-water fraction had 58.1% chlorine.

Table I which follows lists the results of experiments performed by reacting 1,1-dichloro-2,3-epoxypropane and 1,1,1-trichloro-2,3-epoxypropane with butadiene in varying proportions utilizing various catalysts and solvents. For convenience, 1,1-dichloro-2,3-epoxypropane is designated as DCPO and 1,1,1-trichloro-2,3-epoxypropane as TCPO. Parts by weight of each monomer is indicated by the numeral which immediately follows its designation. The molecular weight of the copolymer is indicated as MW.

TABLE I

| Example | Monomer | Solvent | Catalyst | Percent Cl | MW | Percent Conversion |
|---|---|---|---|---|---|---|
| 5 | TCPO, 1 | Butadiene, 2 | $CH_2Cl_2$ | $BF_3$ | 38.9 | 851 | 87 |
| 6 | TCPO, 1 | Butadiene, 1 | $CHCl_3$ | $BF_3$ | 50.2 | 712 | 84 |
| 7 | DCPO, 1 | do | $CH_2Cl_2$ | $BF_3$ | | 1,211 | 81 |
| 8 | TCPO, 1 | do | $CH_2Cl_2$ | $BF_3$ | | 1,115 | 92 |
| 9 | TCPO, 1 | do | $CH_2Cl_2$ | $SbCl_5$ | | | 3 |
| 10 | TCPO, 1 | do | $CH_3Cl$ | $BF_3$ | | 1,312 | 89 |
| 11 | TCPO, 2 | do | $CH_2Cl_2$ | $BF_3$ | 49.3 | | 97 |

In Table II which follows are listed results of experiments which were carried out to determine the effect of varying the monomer ratios on the physical and chemical properties of the resulting copolymer. The reactions were carried out in methylene chloride using $BF_3$ as a catalyst. The reaction was carried out at a temperature of $-30°$ C. The various molar ratios of monomer utilized are listed, together with the percent yield, molecular weight, chlorine content, and density of the final product. For convenience 1,1,1-trichloro-2,3-epoxypropane is designated as TCPO, and butadiene is designated as BD.

The data in the table indicate that optimum conversion of monomer to polymer was achieved at ratios of 2:1, 1:1, and 1:2. The molecular weight, as determined by the boiling point elevation, increased as the copolymer became richer in butadiene. The increase in butadiene also resulted in a decrease in the density of the copolymer, the density appears to be directly proportional to the chlorine concentration.

TABLE II

| Example | TCPO/BD, Molar Ratio | Percent Yield | Molecular Weight | Percent Chlorine | | Density |
|---|---|---|---|---|---|---|
| | | | | Calc. | Determined | |
| 12 | 3:1 | 75 | 1,734 | 59.3 | 58.7 | 1.640 |
| 13 | 2:1 | 89 | 1,175 | 56.4 | 56.7 | 1.588 |
| 14 | 1:1 | 89 | 1,296 | 49.4 | 47.5 | 1.557 |
| 15 | 1:2 | 93 | 1,610 | 39.5 | 39.7 | 1.424 |
| 16 | 1:3 | 72 | 2,774 | 33.0 | 27.1 | 1.29 |
| 17 | 1:9 | | 4,520 | 16.2 | 14.2 | |

*Example 18.—Chlorination of 1,1,1-trichloro-2,3-epoxypropane/butadiene copolymer*

A copolymer of 1,1,1-trichloro-2,3-epoxypropane and butadiene in 1:1 molar ratio was prepared according to the method described in Example 4. The resulting polymer was then dissolved in methylene chloride at a temperature of $-20°$ C. Chlorine was introduced into the solution and chlorination proceeded to about 60% completion with respect to the pendant unsaturated groups. The partially chlorinated copolymer was then placed in carbon tetrachloride at a temperature of $+80°$ C. and further reacted with chlorine until chlorination of the double bonds was substantially complete. Further chlorination was attempted at $180°$ C. in o-dichlorobenzene but resulted in an increased chlorine content of only 1.3%. The resulting copolymer was a highly chlorinated product exhibiting excellent fire resistance.

In place of chlorine, the other free halogens, fluorine, bromine, or iodine may be added to the pendant double bonds of the copolymers of the invention by conventional procedure similar to that described above in Example 18.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A polyhalogenous copolymer comprising the reaction product of:
    (1) an alkylene oxide containing from 3 to 4 carbon atoms, inclusive, and having an alkyl group attached to a carbon atom of the oxirane ring, said alkyl group having a maximum of 2 carbon atoms and containing at least 2 halogen atoms bonded to the same terminal carbon atom, and
    (2) an ethylenically-unsaturated compound having a plurality of polymerizable carbon-to-carbon double bonds,
said copolymer being characterized by the presence of pendant alkyl groups having a maximum of 2 carbon atoms and having at least 2 halogen atoms bonded to the same terminal carbon atom, and by the presence of ethylenically-unsaturated groups.

2. A copolymer according to claim 1, wherein said alkylene oxide (1) is a 1-polyhalogeno-2,3-epoxypropane.
3. A copolymer according to claim 1, wherein said alkylene oxide (1) is a 1-polyhalogeno-2,3-epoxybutane.
4. A copolymer according to claim 1, wherein said alkylene oxide (1) is 1,1-dichloro-2,3-epoxypropane.
5. A copolymer according to claim 1, wherein said alkylene oxide (1) is 1,1-dichloro-3,4-epoxybutane.
6. A copolymer according to claim 1, wherein said alkylene oxide (1) is 1,1,1-trichloro-2,3-epoxypropane.
7. A copolymer according to claim 1, wherein said alkylene oxide (1) is 1-bromo-1,1-dichloro-2,3-epoxypropane.
8. A copolymer according to claim 1, wherein said alkylene oxide (1) is 1,1,1-trichloro-3,4-epoxybutane.
9. A copolymer according to claim 1, wherein said alkylene oxide (1) is 1-bromo-1,1-dichloro-2,3-epoxybutane.
10. A copolymer according to claim 1, wherein said ethylenically-unsaturated compound (2) is butadiene.
11. A copolymer according to claim 1, wherein said ethylenically-unsaturated compound (2) is isoprene.
12. A copolymer according to claim 1, wherein said ethylenically-unsaturated compound (2) is chloroprene.
13. A copolymer according to claim 1, wherein said ethylenically-unsaturated compound (2) is divinylbenzene.
14. A copolymer according to claim 1, which has been subsequently halogenated with a free halogen.
15. A polyhalogenous copolymer comprising the reaction product of (1) 1,1-dichloro-2,3-epoxypropane and (2) butadiene.
16. A polyhalogenous copolymer comprising the reaction product of (1) 1,1,1-trichloro-2,3-epoxypropane and (2) butadiene.
17. A polyhalogenous copolymer according to claim 1, wherein the molar ratio of said alkylene oxide (1) to said ethylenically-unsaturated compound (2) is in the range of about 1:3 to about 3:1.
18. A method for the production of a polyhalogenous copolymer which comprises reacting together:
    (1) an alkylene oxide containing from 3 to 4 carbon atoms, inclusive, and having an alkyl group attached to a carbon atom of the oxirane ring, said alkyl group having a maximum of 2 carbon atoms and containing at least 2 halogen atoms bonded to the same terminal carbon atom, and
    (2) a copolymerizable ethylenically-unsaturated compound having a plurality of polymerizable carbon-to-carbon double bonds,
said copolymer being characterized by the presence of pendant alkyl groups having a maximum of 2 carbon atoms and having at least 2 halogen atoms bonded to the same terminal carbon atom, and by the presence of ethylenically-unsaturated groups.

19. A method for the production of a polyhalogenous copolymer which comprises reacting together:
    (1) an alkylene oxide containing from 3 to 4 carbon atoms, inclusive, and having an alkyl group attached to a carbon atom of the oxirane ring, said alkyl group having a maximum of 2 carbon atoms and containing at least 2 halogen atoms bonded to the same terminal carbon atom, and
(2) a copolymerizable ethylenically-unsaturated compound having a plurality of polymerizable carbon-to carbon double bonds,
in the presence of:
(3) a solvent, and
(4) a polymerization catalyst,
said copolymer being characterized by the presence of pendant alkyl groups having a maximum of 2 carbon atoms and having at least 2 halogen atoms bonded to the same terminal carbon atom, and by the presence of pendant ethylenically-unsaturated groups.

20. A method according to claim 19, wherein said solvent is a polar solvent.

21. A process according to claim 19, wherein said catalyst is a Lewis acid.

22. A process according to claim 19, wherein said catalyst is boron trifluoride.

23. A process according to claim 19, wherein said solvent (3) is methylene chloride and said catalyst (4) is boron trifluoride.

24. A process according to claim 19, wherein the reaction is carried out at a temperature in the range of about −30 to about +30° C.

25. A process for the production of a polyhalogenous copolymer which comprises reacting (1) 1,1-dichloro-2,3-epoxypropane with (2) butadiene in (3) a polar organic solvent in the presence of (4) boron trifluoride as a catalyst.

26. A process for the production of a polyhalogenous copolymer which comprises reacting together (1) 1,1,1-trichloro-2,3-epoxypropane with (2) butadiene in (3) a polar organic solvent in the presence of (4) boron trifluoride as a catalyst.

27. A process for the production of a polyhalogenous copolymer which comprises reacting together:
(1) an alkylene oxide containing from 3 to 4 carbon atoms, inclusive, and having an alkyl group attached to a carbon ring of the oxirane ring, said alkyl group having a maximum of 2 carbon atoms and containing at least 2 halogen atoms bonded to the same terminal carbon atom, and
(2) a copolymerizable ethylenically-unsaturated compound having a plurality of carbon-to-carbon double bonds, in the presence of
(3) an organic solvent, and
(4) a polymerization catalyst,
and subsequently halogenating the copolymer by reaction with a free halogen.

28. A process according to claim 27, wherein said halogen is chlorine.

29. A process according to claim 27, wherein said ethylenically-unsaturated compound (2) is butadiene.

References Cited
UNITED STATES PATENTS

| | | | |
|---|---|---|---|
| 2,829,131 | 4/1958 | Greenspan et al. | 260—83.7 |
| 2,829,135 | 4/1958 | Greenspan et al. | 260—96 |
| 2,951,829 | 9/1960 | Chiddix et al. | 260—2 |
| 3,009,906 | 11/1961 | Eichhorn et al. | 260—93.5 |
| 3,044,999 | 7/1962 | Tousignant | 260—87.5 |
| 3,067,170 | 12/1962 | Carey | 260—2 |
| 3,077,467 | 2/1963 | Gurgiolo | 260—94.2 |
| 3,135,705 | 6/1964 | Vandenberg | 260—2 |

JOSEPH L. SCHOFER, *Primary Examiner.*

H. I. CANTOR, D. K. DENENBERG,
*Assistant Examiners.*